(12) United States Patent
Pan et al.

(10) Patent No.: US 10,871,813 B2
(45) Date of Patent: Dec. 22, 2020

(54) TEMPERATURE INCREASING DEVICE AND TEMPERATURE INCREASING METHOD

(71) Applicant: PEGATRON CORPORATION, Taipei (TW)

(72) Inventors: Chien-Lun Pan, Taipei (TW); Chi-Hsin Lin, Taipei (TW); Chia-Hsing Yu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 99 days.

(21) Appl. No.: 16/396,987

(22) Filed: Apr. 29, 2019

(65) Prior Publication Data

US 2019/0384369 A1    Dec. 19, 2019

(30) Foreign Application Priority Data

Jun. 15, 2018    (TW) .............................. 107120833 A

(51) Int. Cl.
| | | |
|---|---|---|
| *G06F 11/30* | (2006.01) | |
| *G06F 1/28* | (2006.01) | |
| *H05B 1/02* | (2006.01) | |
| *G06F 9/4401* | (2018.01) | |
| *H05B 3/22* | (2006.01) | |

(52) U.S. Cl.
CPC .............. *G06F 1/28* (2013.01); *G06F 9/4401* (2013.01); *G06F 11/3031* (2013.01); *G06F 11/3058* (2013.01); *H05B 1/0227* (2013.01); *H05B 3/22* (2013.01)

(58) Field of Classification Search
CPC . G06F 9/4401; G06F 11/3058; H05B 1/0227; H05K 1/0201
See application file for complete search history.

(56) References Cited

U.S. PATENT DOCUMENTS

| | | | |
|---|---|---|---|
| 8,745,367 B2 | 6/2014 | Wang et al. | |
| 8,972,709 B2 | 3/2015 | Chiu | |
| 2013/0013937 A1* | 1/2013 | Koshimizu | ............. G06F 1/206 713/300 |

FOREIGN PATENT DOCUMENTS

| | | |
|---|---|---|
| CN | 201060431 Y | 5/2008 |
| CN | 200919960 | 7/2008 |

(Continued)

*Primary Examiner* — Albert Wang
(74) *Attorney, Agent, or Firm* — McClure, Qualey & Rodack, LLP

(57) ABSTRACT

The application provides a temperature increasing device and a temperature increasing method. The temperature increasing device is arranged on a motherboard including at least one system element. The temperature increasing device includes a power supply module and a controller After the power supply module is triggered, the power supply module outputs an enable signal to the system element and the controller, the controller detects whether the system element operates according to a preset power-on action, if the controller determines that the system element does not operate according to the preset power-on action, the controller outputs an electric signal to enable the temperature of the system element to increase, and when the temperature of the system element is increased to an extent that the controller determines that the system element is capable of operating according to the preset power-on action, the controller stops outputting the electric signal.

20 Claims, 4 Drawing Sheets

(56) References Cited

FOREIGN PATENT DOCUMENTS

| | | |
|---|---|---|
| CN | 103064484 A | 4/2013 |
| CN | 103150000 A | 6/2013 |
| TW | 201242499 A1 | 10/2012 |

* cited by examiner

TEMPERATURE INCREASING DEVICE AND TEMPERATURE INCREASING METHOD

This non-provisional application claims priority under 35 U.S.C. § 119(a) to Patent Application No. 107120833 filed in Taiwan, R.O.C. on Jun. 15, 2018, the entire contents of which are hereby incorporated by reference.

BACKGROUND

Technical Field

The application relates to a device and a method, in particular to a temperature increasing device and a temperature increasing method.

Related Art

Power-on and operation of electronic devices are often affected by ambient temperature. For example, when a computer is in a low-temperature environment, sometimes the computer cannot be powered on normally, or after being powered on, it cannot start up and operate normally. Traditionally, in order to enable the computer to work normally, a winding on a Flexible Printed Circuit (FPC) is used as a heater, and the FPC is bonded to an important part for heating, so as to overcome the effects of the low-temperature environment.

However, in the traditional method, since the FPC is used for heating, the cost of the FPC needs to be additionally increased and the heating efficiency still needs to be improved.

SUMMARY

The application provides a temperature increasing system and method in order to improve the problems in the prior art.

In one embodiment of the application, a temperature increasing device provided by the application is arranged on a motherboard including at least one system element. The temperature increasing device includes a power supply module and a controller, the power supply module is electrically connected to the at least one system element, and the controller is electrically connected to the at least one system element and the power supply module. After the power supply module is triggered, the power supply module outputs an enable signal to the at least one system element and the controller, the controller detects whether the at least one system element operates according to a preset power-on action, if the controller determines that the at least one system element does not operate according to the preset power-on action, the controller outputs an electric signal to increase the temperature of the at least one system element, and when the temperature of the at least one system element is increased to an extent that the controller determines that the at least one system element is capable of operating according to the preset power-on action, the controller stops outputting the electric signal.

In one embodiment of the application, the power supply module includes a power supply switch and a power supply element, and when the power supply switch is triggered, the power supply element outputs the enable signal to the at least one system element and the controller.

In one embodiment of the application, the motherboard further includes a plurality of peripheral elements located around the at least one system element, and after the power supply element outputs the enable signal to the at least one system element, if the at least one system element does not send a feedback signal to the controller, the controller determines that the at least one system element does not operate according to the preset power-on action.

In one embodiment of the application, when the controller determines that the at least one system element does not operate according to the preset power-on action, the controller outputs the electric signal to the power supply element at a frequency such that the power supply element repeatedly provides the enable signal and a disable signal to the system element, so that the at least one system element alternately performs the preset power-on action and a power-off action such that the temperature of the at least one system element and the peripheral elements is increased, and till the at least one system element sends the feedback signal to the controller, the controller determines that the at least one system element is capable of operating according to the preset power-on action and the controller stops outputting the electric signal.

In one embodiment of the application, when the controller determines that the at least one system element does not operate according to the preset power-on action, the controller outputs the electric signal to the power supply element such that the power supply element continuously provides the enable signal to the at least one system element, so that the at least one system element continuously restarts the preset power-on action such that the temperature of the at least one system element and the peripheral elements is increased, and till the at least one system element sends the feedback signal to the controller, the controller determines that the at least one system element is capable of operating according to the preset power-on action and the controller stops outputting the electric signal.

In one embodiment of the application, the at least one system element includes at least one of a central processing unit and a hard disk.

In one embodiment of the application, the temperature increasing device includes a heating module and a temperature sensor. The heating module is arranged on the motherboard and electrically connected to the controller, and the temperature sensor is electrically connected to the controller and used for sensing the temperature of the at least one system element. If the controller determines that the temperature is lower than predetermined temperature such that the system element does not operate according to the preset power-on action, the controller outputs the electric signal to the heating module such that the heating module heats the at least one system element to increase the temperature, and till the controller determines that the temperature is higher than the predetermined temperature such that the at least one system element is capable of operating according to the preset power-on action, the controller stops outputting the electric signal to the heating module.

In one embodiment of the application, the heating module includes a heating wire and a power supply part. The heating wire surrounds at least one system element, and the power supply part is electrically connected to the heating wire and the controller. If the controller determines that the temperature is lower than the predetermined temperature such that the at least one system element does not operate according to the preset power-on action, the controller outputs the electric signal to the power supply part, so that the power supply part supplies power to the heating wire to increase the temperature of the heating wire and the at least one system element is heated to increase the temperature through the heating wire with temperature which has been increased, and till the controller determines that the temperature is higher than the predetermined temperature such that the at least one system element is capable of operating according to the preset power-on action, the controller stops outputting the electric signal to the power supply part.

In one embodiment of the application, the heating module includes a metal part and a power supply part. The metal part is arranged on the motherboard and jointed to the at least one system element, and the power supply part is electrically connected to the metal part and the controller. If the controller determines that the temperature is lower than the predetermined temperature such that the at least one system element does not operate according to the preset power-on action, the controller outputs the electric signal to the power supply part, so that the power supply part provides current for the metal part to increase the temperature of the metal part and the at least one system element is heated to increase the temperature through the metal part with temperature which has been increased, and till the controller determines that the temperature is higher than the predetermined temperature such that the at least one system element is capable of operating according to the preset power-on action, the controller stops outputting the electric signal to the power supply part.

In one embodiment of the application, the power supply part is a fixed-current source and the current is constant current.

In one embodiment of the application, a temperature increasing method provided by the application is applicable to a motherboard including at least one system element electrically connected to a power supply module. The temperature increasing method includes the following steps: after the power supply module is triggered, the power supply module outputting an enable signal to the at least one system element; detecting whether the at least one system element operates according to a preset power-on action; if it is determined that the at least one system element does not operate according to the preset power-on action, outputting an electric signal to increase the temperature of the at least one system element; and when the temperature of the at least one system element is increased to an extent that the at least one system element is capable of operating according to the preset power-on action, stopping outputting the electric signal.

To sum up, the technical solution of the application has obvious advantages and beneficial effects compared with the prior art. By means of the technical solution of the application, a completely novel heating method is provided, no FPC is used and the heating efficiency is good.

The application will be described below in detail in the following embodiments, and further explanation will be provided for the technical solution of the application.

BRIEF DESCRIPTION OF THE DRAWINGS

In order to make the above-mentioned and other purposes, features, advantages and embodiments of the application be more obvious and understandable, the accompanying drawings will be described as follows.

DETAILED DESCRIPTION OF THE EMBODIMENTS

Figure 1:
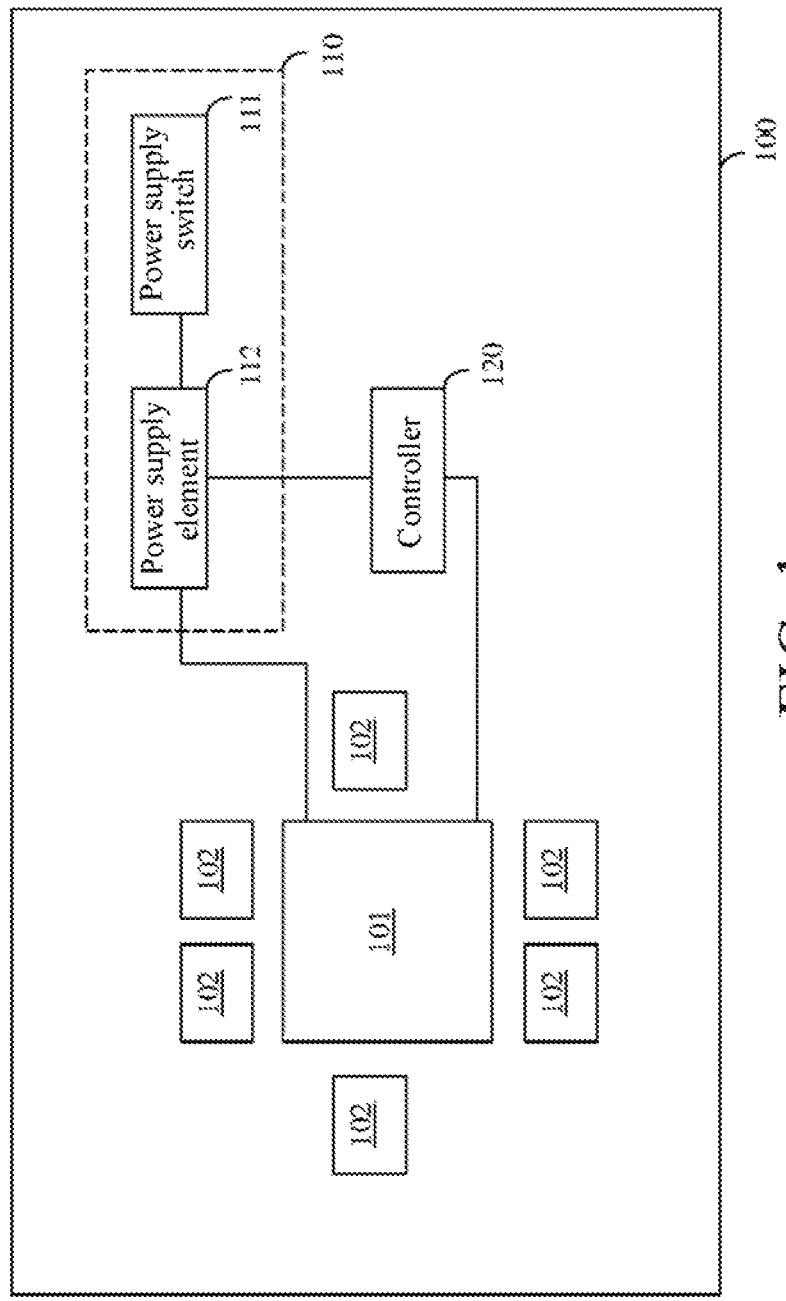
FIG. 1 illustrates a schematic view of a temperature increasing device according to one embodiment of the application.

In order to make the description of the application be more detailed and complete, reference may be made to the accompanying drawings and the various embodiments described below, and the same number in the drawings represents the same or similar element. On the other hand, well-known elements and steps are not described in the embodiments to avoid unnecessary limitations to the application.

In the scope of the embodiments and the application for patent, the description related to "connect" generally refers to the indirect coupling of one element to another through other elements, or the direct connection of one element to another without any other elements.

In the scope of the embodiments and the application for patent, unless there are special restrictions on articles herein, "one" and "the" can generally refer to one or more.

FIG. 1 illustrates a schematic view of a temperature increasing device according to one embodiment of the application. As illustrated in FIG. 1, the temperature increasing device is arranged on a motherboard 100 including at least one system element 101. In the present embodiment, description is made by taking one system element as an example. The temperature increasing device includes a power supply module 110 and a controller 120. Structurally, the power supply module 110 is electrically connected to the system element 101, and the controller 120 is electrically connected to the system element 101 and the power supply module 110. For example, the controller 120 may be a microcontroller, an embedded controller, or other circuit element capable of providing the same function.

In FIG. 1, the power supply module 110 includes a power supply switch 111 and a power supply element 112. Structurally, the power supply switch 111 is electrically connected to the power supply element 112, and the power supply element 112 is electrically connected to the system element 101 and the controller 120. For example, the power supply element 112 may be a power switching chip, which may include a DC-DC converter for converting external DC voltage into DC voltage applicable to the system element 101, wherein the external power may be direct current converted by an AC-DC converter from commercial power or direct current supplied by a battery.

During operation, if a user triggers the power supply switch 111, the power supply module 110 is triggered and the power supply element 112 outputs an enable signal to the system element 101 and the controller 120.

After the power supply module 110 is triggered, the power supply module 110 outputs an enable signal to the system element 101 and the controller 120, the controller 120 detects whether the system element 101 operates according to a preset power-on action, if the controller 120 determines that the system element 101 does not operate according to the preset power-on action, the controller 120 outputs an electric signal to increase the temperature of the system element 101, and when the temperature of the system element 101 is increased to an extent that the controller 120 determines that the system element 101 is capable of operating according to the preset power-on action, the controller 120 stops outputting the electric signal. Then, the system element 101 is capable of normally performing the complete power-on action.

Specifically, the motherboard 100 further includes a plurality of peripheral elements 102 located around the system element 101. For example, the system element 101 may be any primary element such as a central processing unit and a hard disk (e.g., a solid state hard disk), the peripheral elements 102 may be any secondary elements such as resistors, capacitors and inductors. After the power supply element 112 outputs the enable signal to the system element 101, if the system element 101 does not send a feedback signal to the controller 120, it represents that the temperature of the system element 101 is too low to operate normally (i.e., loses the ability to send signals), the controller 120 determines that the system element 101 does not operate according to the preset power-on action.

In one embodiment of the application, the preset power-on action is the normal power-on action. For example, the primary element such as the system element 101, such as the central processing unit or the hard disk, after the power supply element 112 outputs the enable signal to the system element 101, performs the preset power-on action, and thereby the feedback signal can be output through the ability of the system element 101 to send signals, and then is loaded into an operating system to complete the routine power-on operation.

When the controller 120 determines that the system element 101 does not operate according to the preset power-on action, the controller 120 outputs the electric signal to the power supply element 112 at a frequency, wherein the frequency may be a preset frequency (e.g., regular frequency, variable frequency or adjustable frequency), such that the power supply element 112 repeatedly provides the enable signal and a disable signal for the system element 101, so that the system element 101 alternately performs the preset power-on action and a power-off action such that the temperature of the system element 101 and the peripheral elements 102 is increased, wherein the increase of the temperature of the peripheral elements 102 facilitates the acceleration of the increase of the temperature of the system element 101, and till the system element 101 sends the feedback signal to the controller 120, since the system element 101 has the ability to send signals, which represents that the system element 101 has been capable of operating normally, the controller 120 determines that the system element 101 is capable of operating according to the preset power-on action and the controller 120 stops outputting the electric signal. Then, the system element 101 is capable of normally performing the complete power-on action.

It should be understood that the above-mentioned regular frequency is a frequency reflecting alternation of the preset power-on action and the power-off action, and the actual number and predetermined duration may be set flexibly by a system designer based on practical experience.

Or, when the controller 120 determines that the system element 101 does not operate according to the preset power-on action, the controller 120 outputs the electric signal to the power supply element 112 such that the power supply element 112 continuously provides the enable signal for the system element 101, so that the system element 101 continuously restarts the preset power-on action such that the temperature of the system element 101 and the peripheral elements 102 is increased, and till the system element 101 sends the feedback signal to the controller 120, since the system element 101 has the ability to send signals, which represents that the system element 101 has been capable of operating normally, the controller 120 determines that the system element 101 is capable of operating according to the preset power-on action and the controller 120 stops outputting the electric signal. Then, the system element 101 is capable of normally performing the complete power-on action.

Figure 2:
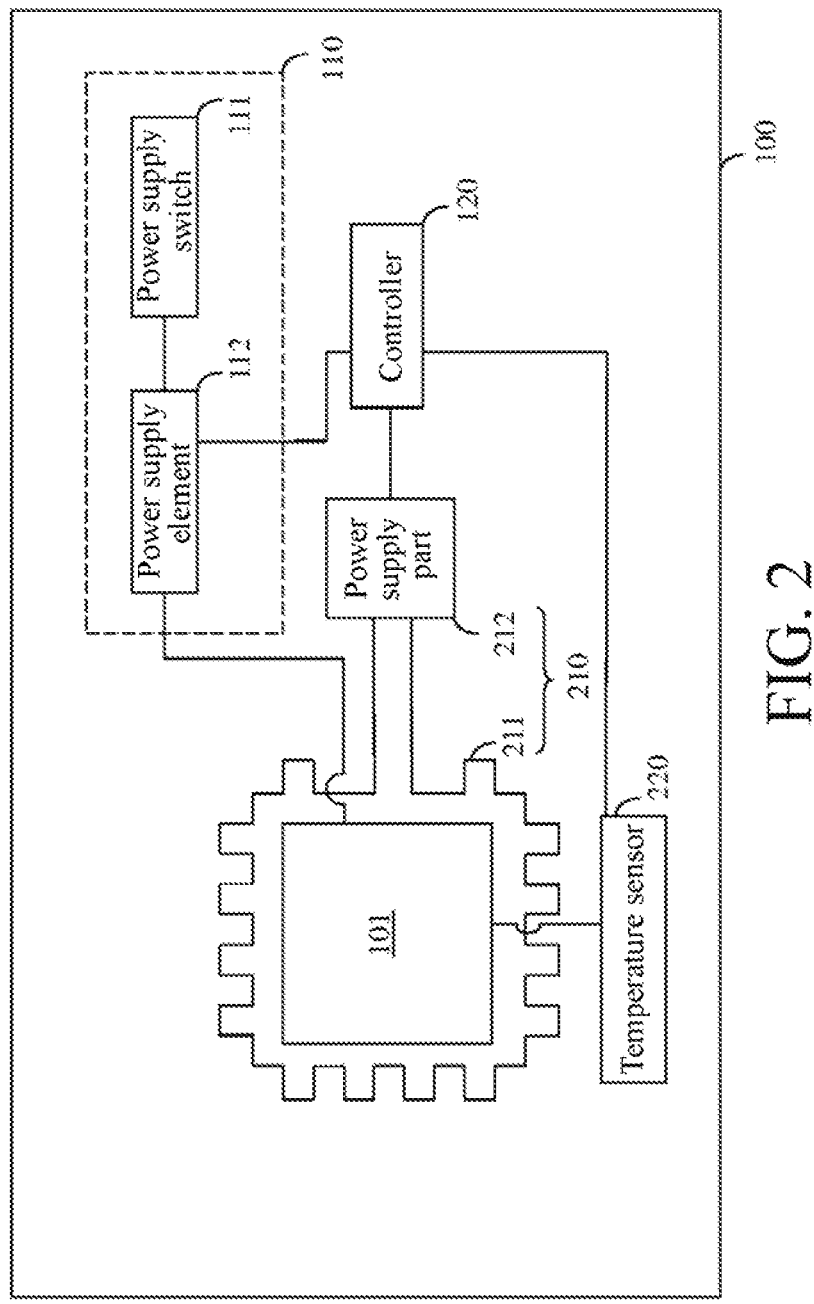
FIG. 2 illustrates a schematic view of a temperature increasing device according to another embodiment of the application.

FIG. 2 illustrates a schematic view of a temperature increasing device according to another embodiment of the application. It should be understood that the same elements or similar operations in FIG. 2 as illustrated in FIG. 1 will not be repetitively described in the present embodiment.

As illustrated in FIG. 2, the motherboard 100 includes a system element 101. In addition to the power supply module 110 and the controller 120, the temperature increasing device further includes a heating module 210 and a temperature sensor 220, and the power supply module 110 also includes a power supply switch 111 and a power supply element 112. Structurally, the heating module 210 is arranged on the motherboard 100 and electrically connected to the controller 120, the controller 120 is electrically connected to the temperature sensor 220, the temperature sensor 220 is arranged on the motherboard 100 and adjacent to the system element 101, and after the power supply module 110 is triggered, the temperature sensor 220 is used for sensing the temperature of the system element 101.

If the controller 120 determines that the temperature of the system element 101 is lower than predetermined temperature such that the system element 101 does not operate according to the preset power-on action, it represents that the temperature of the system element 101 is too low to realize normal power-on, the controller 120 outputs the electric signal to the heating module 210 such that the heating module 210 heats the system element 101 to increase the temperature, and till the controller 120 determines that the temperature is higher than the predetermined temperature such that the system element is capable of operating according to the preset power-on action, the controller 120 stops outputting the electric signal to the heating module 210. Then, the system element 101 is capable of normally performing the complete power-on action.

In FIG. 2, the heating module 210 includes a heating wire 211 and a power supply part 212. Structurally, the heating wire 211 surrounds the system element 101, and the power supply part 212 is electrically connected to the heating wire 211, the controller 120 and the power supply module 110. For example, the heating wire 211 (e.g., metal wire) may be embedded in the motherboard 100 to uniformly heat and save space.

During operation, the temperature sensor 220 senses the temperature of the system element 101. If the controller 120 determines that the temperature of the system element 101 is lower than the predetermined temperature such that the system element 101 does not operate according to the preset power-on action, it represents that the temperature of the system element 101 is too low to realize normal power-on, the controller 120 outputs the electric signal to the power supply part 212, so that the power supply part 212 supplies power to the heating wire 211 to increase the temperature of the heating wire and the system element 101 is heated to increase the temperature through the heating wire 211 with temperature which has been increased, and till the controller 120 determines that the temperature of the system element 101 is higher than the predetermined temperature such that the system element 101 is capable of operating according to the preset power-on action, the controller 120 stops outputting the electric signal to the power supply part 212 such that the power supply part 212 is turned off. Then, the system element 101 is capable of normally performing the complete power-on action.

Figure 3:
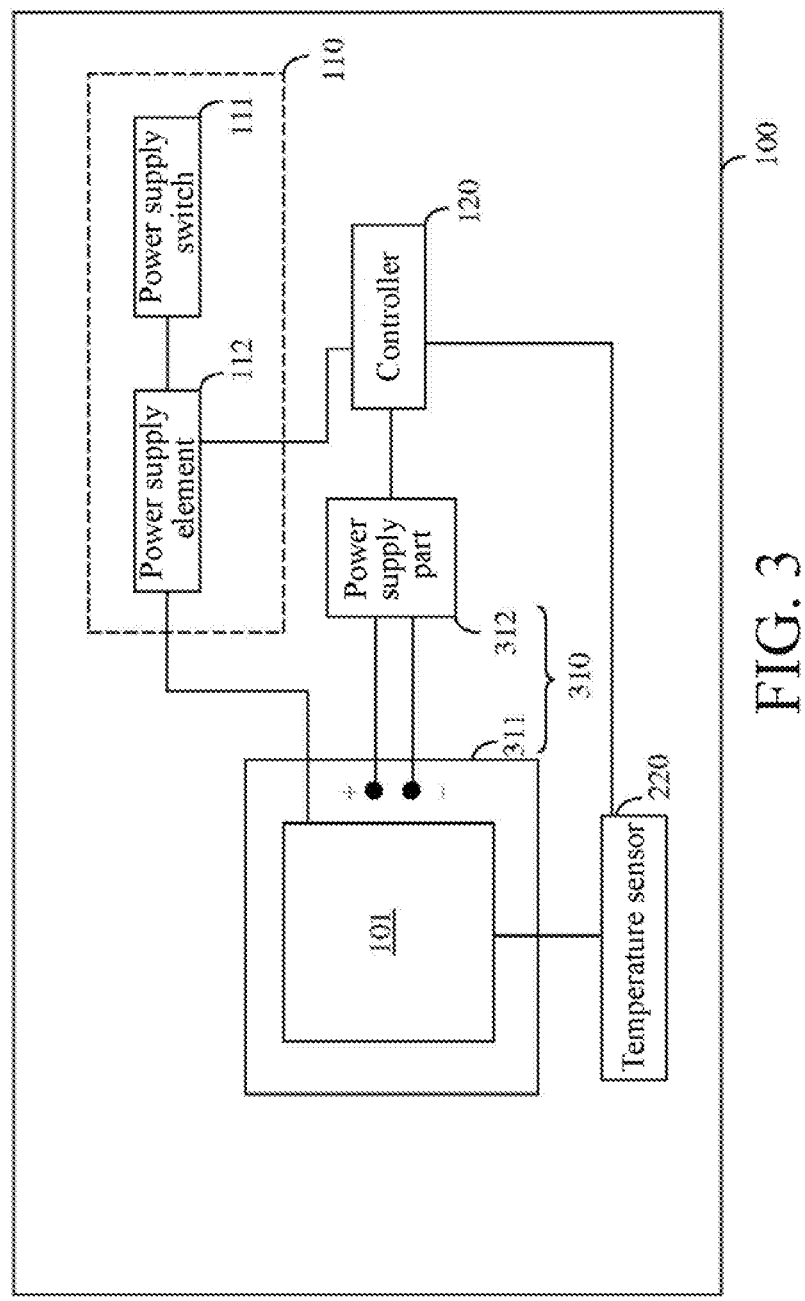
FIG. 3 illustrates a schematic view of a temperature increasing device according to another embodiment of the application.

FIG. 3 illustrates a schematic view of a temperature increasing device according to another embodiment of the application. It should be understood that the same elements or similar operations in FIG. 3 as illustrated in FIG. 1 and FIG. 2 will not be repetitively described in the present embodiment.

As illustrated in FIG. 3, the motherboard 100 includes a system element 101. In addition to the power supply module 110 and the controller 120, the temperature increasing device includes a heating module 310 and a temperature sensor 220, and the power supply module 110 also includes a power supply switch 111 and a power supply element 112. Structurally, the heating module 310 is arranged on the motherboard 100 and electrically connected to the controller 120, and the heating module 310 includes a metal part 311 and a power supply part 312. Structurally, the metal part 311 is arranged on the motherboard 100 and jointed to the system element 101, and the power supply part 312 is electrically connected to the metal part 311, the controller 120 and the power supply module 110. For example, the metal part 311 may be a metal radiator, such as cooling fins.

It should be understood that, after the normal power-on, since the system element 101 (e.g., the central processing unit) will generate a lot of heat during normal operation, by jointing the metal part 311 to the system element 101, the cooling of the system element 101 during operation is facilitated and the failure is avoided.

If the controller 120 determines that the temperature of the system element 101 is lower than the predetermined temperature such that the system element 101 does not operate according to the preset power-on action, it represents that the temperature of the system element 101 is too low to realize normal power-on, the controller 120 outputs the electric signal to the power supply part 312, so that the power supply part 312 supplies current to the metal part 311 to increase the temperature of the metal part 311 and the system element 101 is heated to increase the temperature through the metal part 311 with temperature which has been increased, and till the controller 120 determines that the temperature of the system element 101 is higher than the predetermined temperature such that the system element 101 is capable of operating according to the preset power-on action, the controller 120 stops outputting the electric signal to the power supply part 312 such that the power supply part 312 is turned off. Then, the system element 101 is capable of normally performing the complete power-on action.

In one embodiment of the application, since the resistance of the metal part 311 is much larger than that of the heating wire 211, in order to ensure that the metal part 311 can receive enough current and generate heat, the power supply part 312 is a fixed-current source. No matter how large the resistance of the connected metal part 311 is, it can provide constant current for the metal part 311, such that the metal part 311 can be stably heated to increase the temperature.

Figure 4:
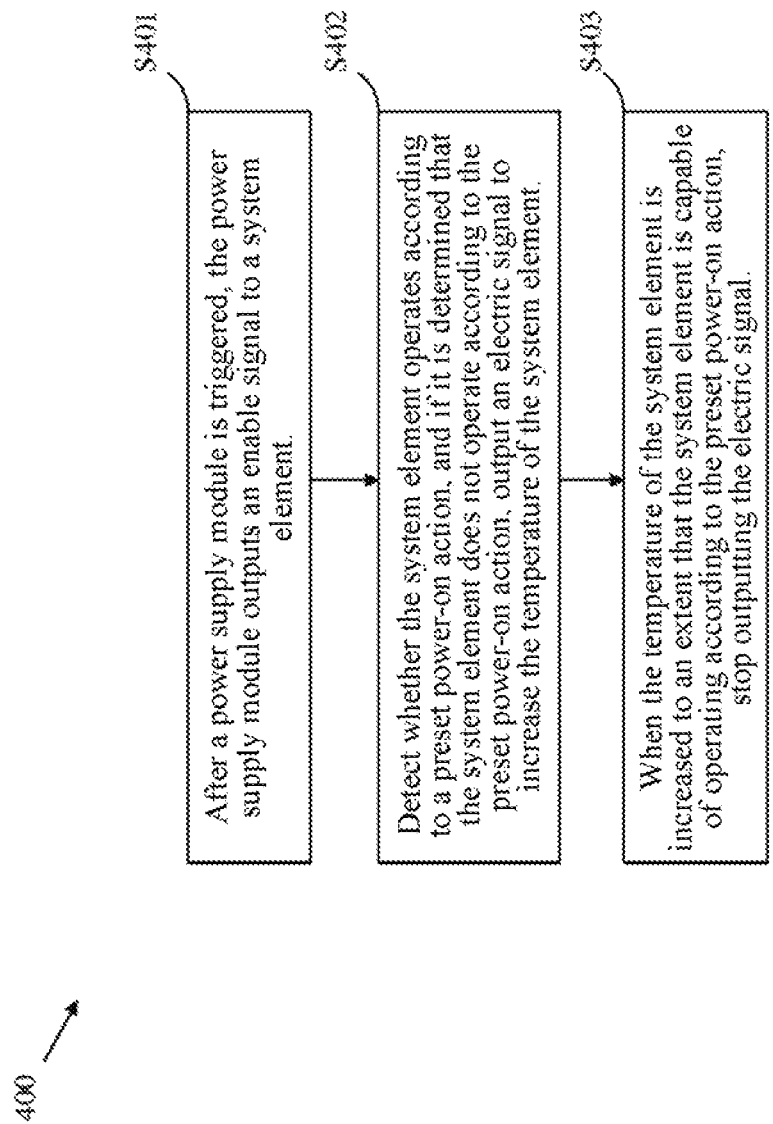
FIG. 4 illustrates a flowchart of a temperature increasing method according to one embodiment of the application.

In order to further describe the operating method of the above-mentioned temperature increasing device, please refer to FIGS. 1 to 4, wherein FIG. 4 illustrates a flowchart of a temperature increasing method 400 according to one embodiment of the application. As illustrated in FIG. 4, the temperature increasing method 400 includes steps S401, S402, and S403 (it should be understood that the steps mentioned in the present embodiment may be adjusted in terms of sequence according to the actual needs, or even performed simultaneously or partially, unless the order is specially stated).

In step S401, after the power supply module 110 is triggered, the power supply module 110 outputs an enable signal to the system element 101; in step S402, whether the system element 101 operates according to a preset power-on action is detected; if it is determined that the system element 101 does not operate according to the preset power-on action, an electric signal is output to increase the temperature of the system element 101; and in step S403, when the temperature of the system element 101 is increased to an extent that the system element 101 is capable of operating according to the preset power-on action, outputting the electric signal is stopped. Then, the system element 101 is capable of normally performing the complete power-on action.

Please refer to FIGS. 1 and 4 at the same time. Specifically, the power supply module 110 includes a power supply switch 111 and a power supply element 112. In step S401, when the power supply switch 111 is triggered, the power supply element 112 outputs the enable signal to the system element 101. After the power supply module outputs the enable signal to the system element 101, if the system element 101 (e.g., central processing unit and/or hard disk) does not send a feedback signal, then in step S402, it is determined that the system element 101 does not operate according to the preset power-on action. When the system element 101 does not operate according to the preset power-on action, the electric signal is output to the power supply element 112 at a frequency such that the power supply element 112 repeatedly provides the enable signal and a disable signal for the system element 101, so that the system element 101 alternately performs the preset power-on action and a power-off action such that the temperature of the system element 101 and the peripheral elements 102 is increased. Or, in step S402, when the system element 101 does not operate according to the preset power-on action, the power supply element 112 continuously provides the enable signal for the system element 101, and thereby the system element 101 continuously restarts the preset power-on action such that the temperature of the system element 101 and the peripheral elements 102 is increased. Then, in step S403, when the system element 101 sends the feedback signal, it is determined that the temperature of the system element 101 is increased to an extent that the system element 101 is capable of operating according to the preset power-on action to stop outputting the electric signal according to the feedback signal. Then, the system element 101 is capable of normally performing the complete power-on action.

Or, please refer to FIGS. 2 and 4 at the same time. In step S401, the temperature of the system element 101 is sensed; in step S402, if it is determined that the temperature of the system element 101 is lower than predetermined temperature such that the system element 101 does not operate according to the preset power-on action, the electric signal is output to the heating module 210 such that the heating module 210 heats the system element 101 to increase the temperature, and till in step S403 it is determined that the temperature of the system element 101 is higher than the predetermined temperature such that the system element 101 is capable of operating according to the preset power-on action, outputting the electric signal to the heating module 210 is stopped.

Specifically, the heating module 210 includes a heating wire 211 and a power supply part 212. In step S402, if it is determined that the temperature of the system element 101 is lower than the predetermined temperature such the system element 101 does not operate according to the preset power-on action, the electric signal is output to the power supply part 212, so that the power supply part 212 supplies power to the heating wire 211 to increase the temperature of the heating wire 211 and the system element 101 is heated to increase the temperature through the heating wire 211 with temperature which has been increased, and till in step S403 it is determined that the temperature of the system element 101 is higher than the predetermined temperature such that the system element 101 is capable of operating according to the preset power-on action, outputting the electric signal to the power supply part 212 is stopped.

Or, please refer to FIGS. 3 and 4 at the same time. In step S401, the temperature of the system element 101 is sensed. In step S402, if it is determined that the temperature of the system element 101 is lower than predetermined temperature such that the system element 101 does not operate according to the preset power-on action, the electric signal is output such that the heating module 310 heats the system element 101 to increase the temperature, and till in step S403 it is determined that the temperature of the system element 101 is higher than the predetermined temperature such that the system element 101 is capable of operating according to the preset power-on action, outputting the electric signal to the heating module 310 is stopped.

Specifically, the heating module includes a metal part 311 and a power supply part 312. In step S401, if it is determined that the temperature of the system element 101 is lower than the predetermined temperature such that the system element 101 does not operate according to the preset power-on action, the electric signal is output to the power supply part 312, so that the power supply part 312 supplies current to the metal part 311 to increase the temperature of the metal part 311 and the system element 101 is heated through the metal part 311 with temperature which has been increased, and till it is determined that the temperature of the system element 101 is higher than the predetermined temperature such that the system element 101 is capable of operating according to the preset power-on action, outputting the electric signal to the power supply part 312 is stopped. In one embodiment of the application, the power supply part 312 is a fixed-current source and the current is constant current.

To sum up, the technical solution of the application has obvious advantages and beneficial effects compared with the prior art. By means of the technical solution of the application, a completely novel heating method is provided, no FPC is used and the heating efficiency is good.

Although the application has been disclosed as above in the form of embodiments, it is not intended to limit the application. One skilled in the art may make various changes and modifications without departing from the spirit and scope of the application. Therefore, the protection scope of the application shall be determined by the claims attached thereto.

What is claimed is:

1. A temperature increasing device arranged on a motherboard including at least one system element, the temperature increasing device comprising:
   a power supply module electrically connected to the at least one system element; and
   a controller electrically connected to the at least one system element and the power supply module, wherein after the power supply module is triggered, the power supply module outputs an enable signal to the at least one system element and the controller, the controller detects whether the at least one system element operates according to a preset power-on action, if the controller determines that the at least one system element does not operate according to the preset power-on action, the controller outputs an electric signal to increase the temperature of the at least one system element, and when the temperature of the at least one system element is increased to an extent that the controller determines that the at least one system element is capable of operating according to the preset power-on action, the controller stops outputting the electric signal.

2. The temperature increasing device according to claim 1, wherein the power supply module comprises a power supply switch and a power supply element, and when the power supply switch is triggered, the power supply element outputs the enable signal to the at least one system element and the controller.

3. The temperature increasing device according to claim 2, wherein the motherboard further comprises a plurality of peripheral elements located around the at least one system element, and after the power supply element outputs the enable signal to the at least one system element, if the at least one system element does not send a feedback signal to the controller, the controller determines that the at least one system element does not operate according to the preset power-on action.

4. The temperature increasing device according to claim 3, wherein when the controller determines that the at least one system element does not operate according to the preset power-on action, the controller outputs the electric signal to the power supply element at a frequency such that the power supply element repeatedly provides the enable signal and a disable signal to the at least one system element, so that the at least one system element alternately performs the preset power-on action and a power-off action such that the temperature of the at least one system element and the peripheral elements is increased, and till the at least one system element sends the feedback signal to the controller, the controller determines that the at least one system element is capable of operating according to the preset power-on action and the controller stops outputting the electric signal.

5. The temperature increasing device according to claim 3, wherein when the controller determines that the at least one system element does not operate according to the preset power-on action, the controller outputs the electric signal to the power supply element such that the power supply element continuously provides the enable signal to the at least one system element, so that the at least one system element continuously restarts the preset power-on action such that the temperature of the at least one system element and the peripheral elements is increased, and till the at least one system element sends the feedback signal to the controller, the controller determines that the at least one system element is capable of operating according to the preset power-on action and the controller stops outputting the electric signal.

6. The temperature increasing device according to claim 3, wherein the at least one system element comprises at least one of a central processing unit and a hard disk.

7. The temperature increasing device according to claim 1, wherein the temperature increasing device comprises:
   a heating module arranged on the motherboard and electrically connected to the controller; and
   a temperature sensor electrically connected to the controller to sense the temperature of the at least one system element, if the controller determines that the temperature is lower than predetermined temperature such that the at least one system element does not operate according to the preset power-on action, the controller outputs the electric signal to the heating module such that the heating module heats the at least one system element to increase the temperature, and till the controller determines that the temperature is higher than the predetermined temperature such that the at least one system element is capable of operating according to the preset power-on action, the controller stops outputting the electric signal to the heating module.

8. The temperature increasing device according to claim 7, wherein the heating module comprises:
a heating wire surrounding the at least one system element; and
a power supply part electrically connected to the heating wire and the controller, if the controller determines that the temperature is lower than the predetermined temperature such that the at least one system element does not operate according to the preset power-on action, the controller outputs the electric signal to the power supply part, so that the power supply part supplies power to the heating wire to increase the temperature of the heating wire and the at least one system element is heated to increase the temperature through the heating wire with temperature which has been increased, and till the controller determines that the temperature is higher than the predetermined temperature such that the at least one system element is capable of operating according to the preset power-on action, the controller stops outputting the electric signal to the power supply part.

9. The temperature increasing device according to claim 7, wherein the heating module comprises:
a metal part arranged on the motherboard and jointed to the at least one system element; and
a power supply part electrically connected to the metal part and the controller, if the controller determines that the temperature is lower than the predetermined temperature such that the at least one system element does not operate according to the preset power-on action, the controller outputs the electric signal to the power supply part, so that the power supply part provides current for the metal part to increase the temperature of the metal part and the at least one system element is heated to increase the temperature through the metal part with temperature which has been increased, and till the controller determines that the temperature is higher than the predetermined temperature such that the at least one system element is capable of operating according to the preset power-on action, the controller stops outputting the electric signal to the power supply part.

10. The temperature increasing device according to claim 9, wherein the power supply part is a fixed-current source and the current is constant current.

11. A temperature increasing method applicable to a motherboard including at least one system element electrically connected to a power supply module, the temperature increasing method comprising the following steps:
after the power supply module is triggered, the power supply module outputting an enable signal to the at least one system element;
detecting whether the at least one system element operates according to a preset power-on action;
if the at least one system element does not operate according to the preset power-on action, outputting an electric signal to increase the temperature of the at least one system element; and
when the temperature of the at least one system element is increased to an extent that the at least one system element is capable of operating according to the preset power-on action, stopping outputting the electric signal.

12. The temperature increasing method according to claim 11, wherein the power supply module comprises a power supply switch and a power supply element, wherein after the power supply module is triggered, the step further comprises:
when the power supply switch is triggered, the power supply element outputting the enable signal to the at least one system element.

13. The temperature increasing method according to claim 12, wherein the system element further comprises a plurality of peripheral elements located around the at least one system element, wherein after the power supply element outputs the enable signal to the at least one system element, the step further comprises:
if the at least one system element does not send a feedback signal, determining that the at least one system element does not operate according to the preset power-on action.

14. The temperature increasing method according to claim 13, wherein, the step of, if the at least one system element does not operate according to the preset power-on action, outputting an electric signal to increase the temperature of the at least one system element, and when the temperature of the at least one system element is increased to an extent that the at least one system element is capable of operating according to the preset power-on action, stopping outputting the electric signal, further comprises:
outputting the electric signal to the power supply element at a frequency such that the power supply element repeatedly provides the enable signal and a disable signal to the at least one system element, so that the at least one system element alternately performs the preset power-on action and a power-off action such that the temperature of the at least one system element and the peripheral elements is increased, and till the at least one system element sends the feedback signal, determining that the at least one system element is capable of operating according to the preset power-on action, and accordingly stop outputting the electric signal.

15. The temperature increasing method according to claim 13, wherein, the step of, if the at least one system element does not operate according to the preset power-on action, outputting an electric signal to increase the temperature of the at least one system element, and when the temperature of the at least one system element is increased to an extent that the at least one system element is capable of operating according to the preset power-on action, stopping outputting the electric signal, further comprises:
the power supply element continuously providing the enable signal to the at least one system element, so that the at least one system element continuously restarts the preset power-on action such that the temperature of the at least one system element and the peripheral elements is increased, and till the at least one system element sends the feedback signal, determining that the at least one system element is capable of operating according to the preset power-on action, and accordingly stop outputting the electric signal.

16. The temperature increasing method according to claim 13, wherein the at least one system element comprises at least one of a central processing unit and a hard disk.

17. The temperature increasing method according to claim 11, wherein a heating module is further comprised and arranged on the motherboard, and the step of, if the at least one system element does not operate according to the preset power-on action, outputting the electric signal to increase the temperature of the at least one system element, and when the temperature of the at least one system element is increased to an extent that the at least one system element is capable of operating according to the preset power-on action, stopping outputting the electric signal, further comprises:

sensing the temperature of the at least one system element, if the temperature is lower than predetermined temperature such that the at least one system element does not operate according to the preset power-on action, outputting the electric signal to the heating module such that the heating module heats the at least one system element to increase the temperature, and till that the temperature is higher than the predetermined temperature such that the at least one system element is capable of operating according to the preset power-on action, stopping outputting the electric signal to the heating module.

18. The temperature increasing method according to claim 17, wherein the heating module comprises a heating wire and a power supply part, the heating wire surrounds the at least one system element, the power supply part is electrically connected to the heating wire, and the step of, if the at least one system element does not operate according to the preset power-on action, outputting the electric signal to increase the temperature of the at least one system element, and when the temperature of the at least one system element is increased to an extent that the at least one system element is capable of operating according to the preset power-on action, stopping outputting the electric signal, further comprises:

if the temperature is lower than the predetermined temperature such that the at least one system element does not operate according to the preset power-on action, outputting the electric signal to the power supply part, so that the power supply part supplies power to the heating wire to increase the temperature of the heating wire and the at least one system element is heated to increase the temperature through the heating wire with temperature which has been increased, and till that the temperature is higher than the predetermined temperature such that the at least one system element is capable of operating according to the preset power-on action, stopping outputting the electric signal to the power supply part.

19. The temperature increasing method according to claim 17, wherein the heating module comprises a metal part and a power supply part, the metal part is arranged on the at least one system element, the power supply part is electrically connected to the metal part, and the step of, if the at least one system element does not operate according to the preset power-on action, outputting the electric signal to increase the temperature of the at least one system element, and when the temperature of the at least one system element is increased to an extent that the at least one system element is capable of operating according to the preset power-on action, stopping outputting the electric signal, further comprises:

if the temperature is lower than the predetermined temperature such that the at least one system element does not operate according to the preset power-on action, outputting the electric signal to the power supply part, so that the power supply part provides current for the metal part to increase the temperature of the metal part and the at least one system element is heated to increase the temperature through the metal part with temperature which has been increased, and till that the temperature is higher than the predetermined temperature such that the at least one system element is capable of operating according to the preset power-on action, stopping outputting the electric signal to the power supply part.

20. The temperature increasing method according to claim 19, wherein the power supply part is a fixed-current source and the current is constant current.

* * * * *